United States Patent [19]
Heiling et al.

[11] Patent Number: 5,136,410
[45] Date of Patent: Aug. 4, 1992

[54] OPTICAL FIBER LINK CONTROL SAFETY SYSTEM

[75] Inventors: Gerald M. Heiling, Pine Island; David A. Knodel, Rochester; Michael J. Peterson, Rochester; Brian A. Schuelke, Rochester; David W. Siljenberg, Byron; Ronald L. Soderstrom; John T. Trnka, both of Rochester, all of Minn.

[73] Assignee: IBM Corporation, Armonk, N.Y.

[21] Appl. No.: 462,367

[22] Filed: Jan. 9, 1990

[51] Int. Cl.⁵ .......................................... H04B 10/12
[52] U.S. Cl. ................................... 359/110; 359/159; 359/173
[58] Field of Search ............... 455/600, 607, 601, 606, 455/612; 250/205; 356/73.1; 359/110, 159, 173

[56] References Cited

U.S. PATENT DOCUMENTS

| | | | |
|---|---|---|---|
| 4,797,556 | 1/1989 | Marzari et al. | 356/73.1 |
| 4,899,043 | 2/1990 | Mochizuki et al. | 455/601 |
| 4,994,675 | 2/1991 | Levin et al. | 455/617 |

FOREIGN PATENT DOCUMENTS

| | | | |
|---|---|---|---|
| 0004346 | 1/1984 | Japan | 455/600 |
| 2195508 | 4/1988 | United Kingdom | 455/600 |

Primary Examiner—Edward L. Coles, Sr.
Assistant Examiner—L. Pascal
Attorney, Agent, or Firm—Joseph J. Kaliko; J. Michael Anglin; Bradley A. Forrest

[57] ABSTRACT

A fully redundant safety interlock system is provided comprising, means for detecting the loss of light on a fiber optic link; controller means, coupled to said means for detecting, for determining the safety condition of the link based on the output of said means for detecting, and for controlling the radiant energy output of an optical transmitter, based on the determined safety condition, via redundant output control signals; and means, coupled to said controller means, responsive to said redundant control signals, for interconnecting the output of said controller means to transmitter drive circuitry to thereby adjust the radiant energy output by the transmitter. According to a preferred embodiment of the invention, the controller means includes an electronic implementation of two independent state machines, each of which redundantly determines the connection state of the optical link between two optical link cards. The output from the state machines is used to adjust (for example, turn on and turn off) the drive circuitry for the transmitter via fully redundant paths which carry the redundant control signals.

37 Claims, 5 Drawing Sheets ion relates to a safety system that can be incorporated on laser based optical fiber link cards, where the safety system is operative to detect open link failures (for example, an optical fiber in the link which has been disconnected or broken), to reduce the laser's radiant energy output (or shut it off) when an open link failure is detected, to periodically check to determine if the failure is corrected, and to restore full continuous power to the laser upon determining that the link is operationally safe.

OPTICAL FIBER LINK CONTROL SAFETY SYSTEM

BACKGROUND OF THE INVENTION

1. Field of the Invention

The invention relates generally to safety systems that limit the amount of radiant energy that can be emitted from an open optical fiber or a transmitter port in an optical communication link. More particularly, the invention relates to a safety system that can be incorporated on laser based optical fiber link cards, where the safety system is operative to detect open link failures (for example, an optical fiber in the link which has been disconnected or broken), to reduce the laser's radiant energy output (or shut it off) when an open link failure is detected, to periodically check to determine if the failure is corrected, and to restore full continuous power to the laser upon determining that the link is operationally safe.

2. Description of the Related Art

Many types of laser based devices and systems, having a wide range of applications, such as in medical technology, in communications and computing technology, etc., are becoming increasingly well known and commercially available.

The lasers used in many of these devices and systems are often capable of producing powerful outputs that are potentially harmful to both people and equipment. As a result, many types of safety devices for use in conjunction with laser based equipment, and standards designed to ensure that laser based equipment may be safely operated, have been developed and continue to evolve.

For example, U.S. Pat. No. 4,423,726, to Imagawa et al, describes a safety device for a laser ray guide (used in the performance of laser surgery) that employs the combination of a lense and a laser ray receiving element, to detect a failure of the laser ray guide. Reflected laser light is used to operate the Imagawa, et al safety system. Although suitable for detecting failures in the local laser based system in which it is used, Imagawa et al does not teach a safety system that controls the laser; does not teach a safety system that shuts the laser down (or limits its power output) upon detecting a failure; and does not teach a safety system suitable for use in performing safety control over long distances, such as over fiber optic links used in communication and/or computing systems.

Safety systems employing reflection to detect fiber failures are both impractical and far too complex (i.e., large and costly) to be used with optical data communication systems because of the difficulty of being able to distinguish the reflection due to a link failure at any point along the link from the reflections due to connectors, splices and the receiver/detector at the end of the link.

Another example of a prior art safety device for a laser based system is taught in U.S. Pat. No. 4,543,477, to Doi et al. This safety system is used to detect problems in an optical transmission fiber of a medical laser application. The system utilizes reflected laser light to control a shutter mechanism which blocks the light when a problem is detected.

Like Imagawa et al, Doi et al does not teach a safety system that controls the laser; does not teach a system that shuts the laser down upon detecting a failure; and does not teach a system that is suitable for performing long distance safety control since reflection is again used as the means for detecting a problem.

In another patent issued to Doi et al, U.S. Pat. No. 4,716,288, a security device is described that detects failures in the transmitting fiber. The application is a high power medical laser used to perform surgery, and features means for detecting fiber damage (using reflection), which disables the laser (to prevent over heating the fiber) when a failure is detected. Although capable of disabling a laser, the Doi et al safety system taught in the 4,716,288 patent, like its predecessor in the 4,543,477 patent, still uses reflection to detect safety problems and therefore is not a system which is suitable for long distance applications.

Yet another example of a prior art safety system is the high power optical fiber failure detection system taught by Ortiz, Jr., in U.S. Pat. No. 4,812,641. The Ortiz, Jr. safety system is used in equipment that employs a high power pulsed laser to perform material processing. A break or leak in an optical fiber transmitting high power laser energy can be detected by the system, which then shuts down the laser beam delivery system when the optical fiber begins to fail. Separate sensing fibers and detectors are used by the system to detect breaks or leaks in the transmitting fiber.

The use of the separate sensing fibers and detectors called for by Ortiz, Jr., would be especially costly and problematic for long distance safety control applications. The need for the additional fiber links and sensing devices, and the necessity for the additional fibers to span long distances, etc., make such a system unsuitable for use in conjunction with many fiber optic links.

All of the above referenced patents deal with the transmission of power over very short lengths (less than a few meters) of optical fiber in which any failures in the fiber link would cause a substantial change in the reflected power (typically an increase in reflectance) and would create both an exposure and a fire hazard. In contrast, a data communications link operates at much lower power levels and over much longer distances (for example, two kilometers would not be unusual) and a failure in the optical link (for example, a disconnected mechanical splice) would create only a viewing hazard and very little change in the amount of reflected power. The impracticality of using reflection combined with the vastly different environments of the current application versus the applications discussed in the referenced patents would make a totally new type of safety control system desirable.

In addition to being able to detect failures in laser based systems and effectively turn a laser off when a fault is detected; it is also desirable in many applications to be able to power the laser back up and resume operations after the condition causing the fault has been corrected.

No safety control systems are known that combine a link failure detection capability, that easily and cost effectively detects link failures over the distances spanned by a particular link, with a control system that is capable of reducing the laser's radiant energy output to a safe level (or shutting laser off) when a failure is detected. Additionally, no safety control systems are known that are also capable of periodically checking to determine if a detected failure is corrected, and causing full continuous power to the laser to be restored upon determining that the link is operationally safe.

With the increasing use of fiber optic technology to provide solutions to performance and packaging problems associated with present day computer interconnect applications, communication applications, etc., small laser based feature cards, such as the optical fiber link card described in copending patent application Ser. No. 07/462,681, filed on even date herewith and assigned to the same assignee as the present invention, are being developed. Copending patent application Ser. No. 07/462,681, is hereby incorporated by reference.

From a safety and product certification point of view, it would be desirable if a safety system could be provided that would make each individual card, such as the card described in the above referenced copending patent application, "fail safe", i.e. certifiably safe at other than a total system level.

Many countries require certification of the "product" with respect to laser light emissions. Prior art laser based optical link subassemblies have a dependency on the "box" they are in to maintain compliance. If a safety system could be devised that could be self contained on each card, then the card would become the "product" that needs to be certified; not all the different models of the boxes that it is used in.

The laser safety standards and certifications referred to hereinabove can be very stringent for an open fiber in an optical communication link. For example, the European IEC laser safety standards for class 1 operation limit the amount of power that can be emitted from an open fiber to a maximum level of approximately $-8$ dBm, which is far below the design point for optimal performance of the link to which the card in the referenced copending patent application is coupled.

In view of the present and evolving standards applicable to laser based optical fiber link systems, including optical fiber link cards, etc., it would be desirable to be able to reduce the certification requirements for such systems as a whole by providing the aforementioned "fail safe" capability at the feature card level. Any safety control system that could provided such a feature would have to be compact enough to fit on an individual card, would need to be compatible with other components on the card (in terms of power requirements, noise, etc.), and would need to be easily and cost effectively operable independent of the length of the fiber link to which the laser on board the card is coupled.

Accordingly, it would be desirable if a safety control system could be provided that (1) operates, in a self contained fashion, as part of an optical fiber link card designed to be coupled to an optical fiber link; (2) operates in cooperation with an identical safety system on the other card included in a bidirectional optical fiber link; (3) provides sufficient safety features to allow the card to conform to all existing worldwide safety regulations for class 1 operation, and to remain class 1 under a single fault condition (class 1 is defined herein as in the International Electrotechnical Commission (IEC) Standard publication number 825, published in 1984); (4) easily and cost effectively detects link failures (such as a disconnected mechanical splice), over the distances spanned by a particular link; (5) reduces (or shuts off) the laser's radiant energy output, when a link failure is detected; (6) periodically checks to determine if the failure is corrected; and (7) restores full continuous power to the laser upon determining that the link is operationally safe.

SUMMARY OF THE INVENTION

It is an object of the invention to provide an optical fiber link control safety system that can be self contained on individual laser based optical fiber link cards to thereby allow individual cards to be certified as meeting laser safety standards.

It is a further object of the invention to provide an optical fiber link control safety system that is particularly well suited for inclusion on cooperating optical fiber link cards used for bidirectional optical data communication over a fiber optic link.

It is a particular object of the invention to provide an optical fiber link control safety system that provides sufficient safety features to allow a card on which it is included to conform to all existing worldwide safety regulations for class 1 operation, and to remain class 1 under a single fault condition in the safety system itself.

Further yet, it is an object of the invention to provide an optical fiber link control safety system that easily and cost effectively detects link failures over the distances spanned by a particular link, reduces (or shuts off) the laser's radiant energy output, when a link failure is detected, periodically checks to determine if the failure is corrected; and restores full continuous power to the laser upon determining that the link is operationally safe.

According to a preferred embodiment of the invention, a fully redundant safety interlock system is provided comprising, means for detecting the loss of light on a fiber optic link; controller means, coupled to said means for detecting, for determining the safety condition of the link based on the output of said means for detecting, and for controlling the radiant energy output of an optical transmitter, based on the determined safety condition, via redundant output control signals; and means, coupled to said controller means, responsive to said redundant control signals, for interconnecting the output of said controller means to transmitter drive circuitry to thereby adjust the radiant energy output by the transmitter.

Furthermore, according to a preferred embodiment of the invention, the controller means includes an electronic implementation of two independent state machines, each of which redundantly determines the connection state of the optical link between two optical link cards. The output from the state machines is used to adjust (for example, turn on and turn off) the drive circuitry for the transmitter via fully redundant paths which carry the redundant control signals.

Further yet, according to a preferred embodiment of the invention, the state machines can exist in any one of four states: (1) a "check" state for the inactive mode of the transmitter (e.g., when the transmitter is off or below the class 1 level for radiant energy output); (2) an "active" state for the active (or normal) mode of the transmitter (e.g., where the transmitter is on continuously); (3) a "stop" state; and (4) a "connect" state. States 3 and 4 exist during a sequence of events in which the transmitter can be switched from the inactive mode to the active mode through a third mode, referred to hereinafter as a connect mode.

The invention features performance capabilities in line with the above stated objectives. Furthermore, the invention is compact, operates with the same power supply as the card on which it is mounted, and features a non-defeatable safety interlock which assures that both cards on a bidirectional link include the safety system before delivering continuous full power to a laser.

These and other objects and features of the present invention and the manner of obtaining them will become apparent to those skilled in the art, and the invention itself will be best understood by reference to the following detailed description read in conjunction with the accompanying Drawing.

DETAILED DESCRIPTION

Figure 1:
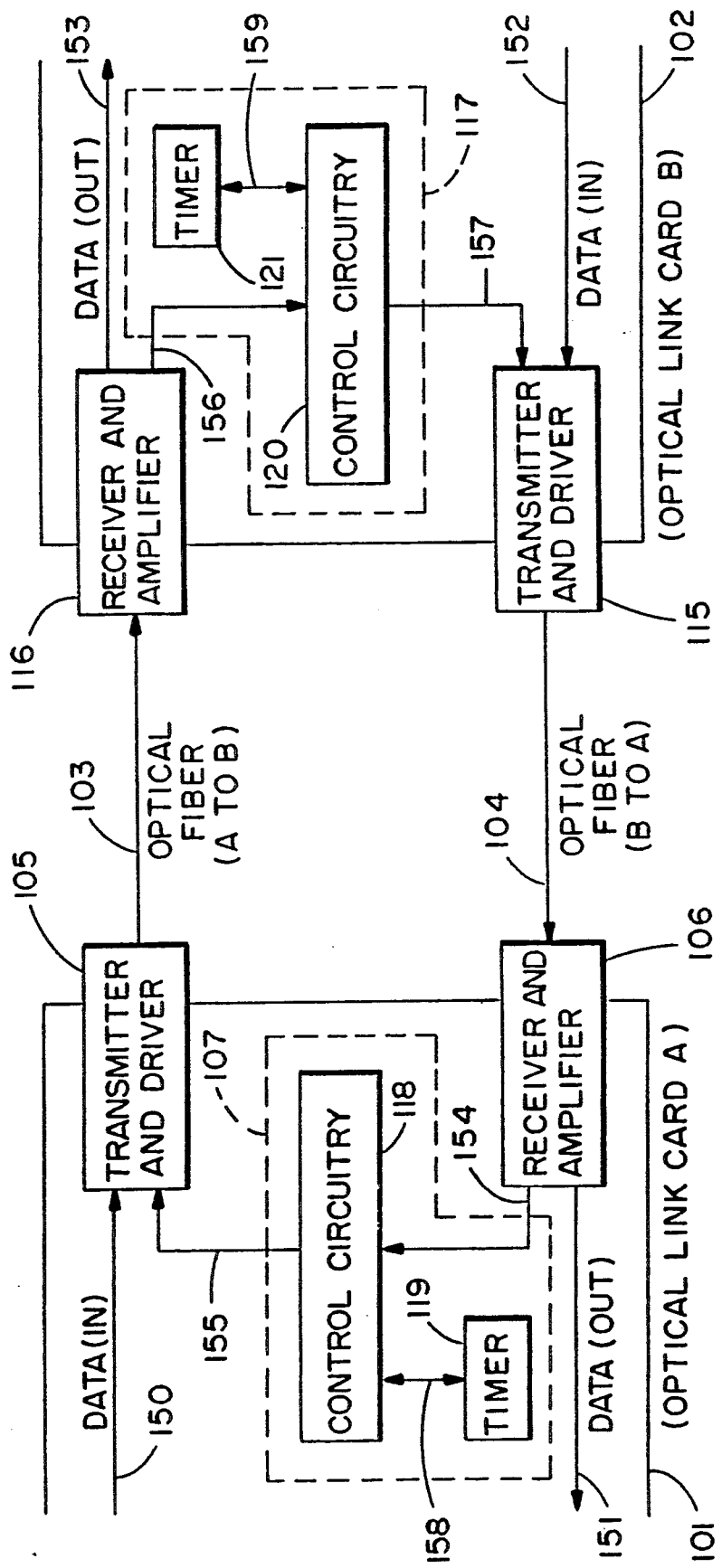
FIG. 1 is a block diagram which depicts an exemplary optical fiber link between two optical fiber link cards, where each card includes a safety system fabricated in accordance with the teachings of the invention.

FIG. 1 is a block diagram which depicts an exemplary optical fiber link communication system in which the invention can be used. The depicted system includes two identical optical link cards, 101 and 102, coupled by optical fibers 103 and 104.

Card 101 is shown to include a transmitter and driver circuitry (shown combined in FIG. 1 as unit 105), a receiver and an amplifier (shown combined in FIG. 1 as unit 106) and the novel safety system, shown as unit 107. Safety system 107 is shown inserted in the path between unit 10 and unit 106 in the manner contemplated by a preferred embodiment of the invention.

Identical card 102 is also shown to include a transmitter and driver circuitry (shown combined in FIG. 1 as unit 115), a receiver and an amplifier (shown combined in FIG. 1 as unit 116), and safety system 117 coupled therebetween.

Each of the safety systems depicted is further shown to include control circuitry and timer means, labeled as control circuitry 118 and timer means 119 in safety system 107, and as control circuitry 120 and timer means 121 in safety system 117.

FIG. 1 also depicts data input and output links 150 and 151 (for card 101); data input and output links 152 and 153 (for card 102); links 154 through 157, for integrating safety systems 107 and 117 onto cards 101 and 102 respectively; and links 158 and 159, which serve as bidirectional links between the control circuitry and the timers in each of the safety systems.

A suitable optical link card for inclusion in a communication system such as the one depicted in FIG. 1, is described in copending patent application Ser. No. 07/462,681, previously incorporated herein by reference. The incorporated application describes in detail all elements of the system depicted in FIG. 1, except for the details of a safety system (referred to in the incorporated application as the optical fiber control (OFC) circuitry).

It should be noted that units 107 and 117 each contain portions of the deserializer (in particular the transition detector) described in the copending patent application. The purpose of this device and how it cooperates with the safety system described herein, will become apparent hereinafter with reference to the description of a preferred means for detecting loss of light in the optical fiber link.

The novel safety system being described herein is explained in the context of its use in conjunction with the type of card described in the incorporated copending application. The novel safety system is actually physically located on the card in a preferred embodiment described in the referenced application. However, those skilled in the art will recognize that describing the instant safety system in relation to such a card, is done for the sake of illustration only. Such description is not intended to limit the scope of this invention which can be used in conjunction with other optical link cards (on or off card), such as cards that have different power plane structures, different overall sizes, shapes and combinations of components.

Further, for the sake of illustration only, the integrated transmitter and drivers (shown as units 105 and 115 in FIG. 1) will be assumed to be laser based, although other types of optical transmitters could conceivably be controlled by the safety system described herein.

Referring again to FIG. 1, the sequence of events which, according to the invention, are to occur after a disconnection in the optical data link, are set forth immediately hereinafter.

If data link 103 becomes disconnected (for example, a connector is separated or the fiber is cut), unit 116 (on card 102) will signal a loss of light to control circuitry 120 in safety system 117 (also on card 102).

Control circuitry 120 turns off the laser in unit 115 (on card 102) and starts timer 121. Since the laser in unit 115 is now off, a Loss of Light signal will be generated at unit 106 at card 101.

In response, control circuitry 118 (on card 101) will then turn off the laser in unit 105 (on card 101), thus creating a safe condition with respect to the opened end of the link (i.e., no laser radiation exposure).

When each laser is turned off, the timer in the control circuitry associated with each laser is started. After a predetermined time T, the control circuitry on each of the cards will turn their respective lasers on for a brief period of time t in order to check the link status.

If the line is now a closed loop (e.g., data link 103 is reconnected), then a reconnect handshake is to take place between the two cards and the lasers will then return to normal operation. If the link is still open, the reconnect handshake will fail and the lasers will once again be turned off for T seconds before the check will be repeated.

It should be noted that, according to a preferred embodiment of the invention, either the expiring of the timer or receiving an optical signal from the other card will cause an attempt to reconnect. Hence, the turning on and off of the two lasers will automatically be synchronized.

If both data links 103 and 104 were disconnected at the same time, both cards would independently turn off their lasers since a loss-of-light signal would be generated at each receiver. Normal operation could not return until both data links were reconnected and the proper reconnect handshake had taken place between the cards.

The use of timers and turning the lasers back on after a predetermined time period allow the overall system to return to a normal mode of functioning after an accidental or purposeful disconnection/reconnection of one or more of the connectors. If this timing retry mechanism was not implemented, the entire external system would have to be shut-down and restarted in order for the link to once again become operational.

When performing system start-up (for the overall system depicted in FIG. 1) or performing link reconnection, the invention contemplates a handshaking operation to take place between cards 101 and 102. This ensures that the unit at the other end of the optical fiber link is another card that is capable of shutting down in the event of a break in the link. If the other end of the link does not respond to the handshaking, then, according to the invention, the laser will remain inactive (i.e., either no emission or brief pulses every T seconds) and thereby maintain a safe link. Hence, this electronic safety module functions as a safety interlock which has been designed to be not defeatable.

The invention uses a repetitive pulsing technique during the time that a link is open (instead of CW operation) in order to reduce the maximum possible exposure to a value which is below the level set by existing worldwide standards for class 1 operation.

Safety circuitry (not the safety system being described herein) in the serializer module on the card described in the incorporated copending patent application, controls the laser's drive current and monitors for various electronic faults. The Open Fiber Link Control (OFC) module (corresponding to the safety system being described herein) has the capability to disable the serializer module and its drive circuitry whenever the optical link between two cards, such as cards 101 and 102 of FIG. 1, is open due to a break or disconnection in the fiber link.

In order to guarantee safety even while a single fault may be present, a fully redundant safety interlock system is employed by the invention.

Figure 2:
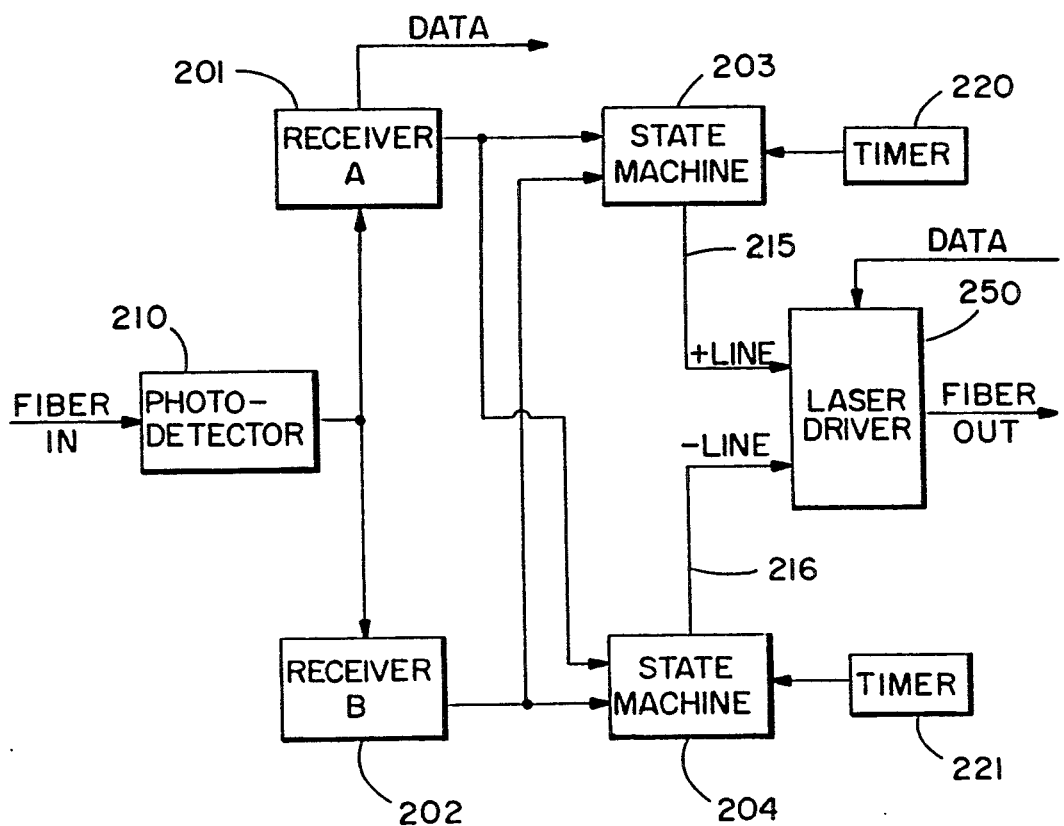
FIG. 2 is a block diagram of a preferred embodiment of a fully redundant optical link safety system fabricated in accordance with the teachings of the invention.

FIG. 2 shows a block diagram of a preferred embodiment of the safety system. A fully redundant optical link safety system is depicted.

Two independent light receivers, 201 and 202, are used to determine the presence of light at detector 210. Each of the receiver's output and the output from a timer (with the two timers, 220 and 221 in FIG. 2, being included in each of timer means 119 and 121 of FIG. 1, to provide redundancy) is fed into two independent state machines. These redundant state machines, shown as machines 203 and 204 in FIG. 2, determine the connection state of the optical link between cards 101 and 102.

In addition, two separate control lines, 215 and 216, of opposite polarity are required in order to activate the laser drive circuits, shown as unit 250, in the serializer module. FIG. 2 indicates that, in accordance with the preferred embodiment of the invention, that the paths through the safety system are fully redundant.

Receiver 201 of FIG. 2, according to a preferred embodiment of the invention, includes the combination of the transition detector referred to in the copending application, together with a digital filter. Receiver 202 of FIG. 2 includes the combination of the DC detector referred to in the copending application, together with a separate digital filter. The function and components of these devices as part of the safety system will be described in detail hereinafter with reference to FIGS. 4 and 5.

Each of state machines 203 and 204 depicted in FIG. 2 are designed, according to the preferred embodiment of the invention, to exist in one of four states; one state for the inactive or check mode of operation where the laser is being pulsed, one state for the active or normal mode of operation where the laser is on continuously, and two states for the connect sequence of events which allow the laser to switch from the inactive to the active modes of operation.

Figure 3:
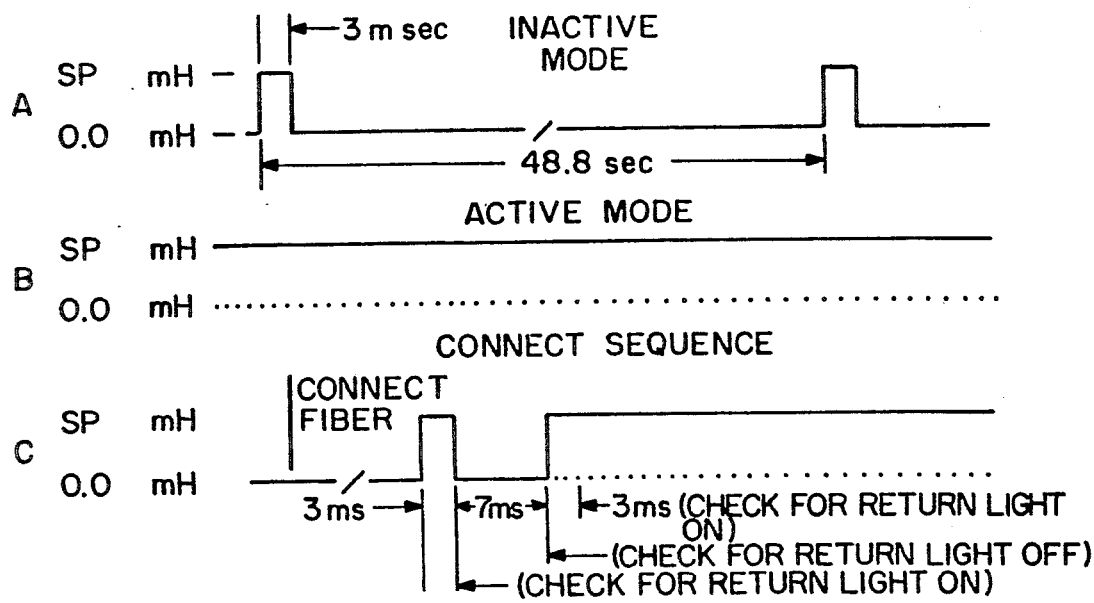
FIG. 3 depicts the power launched into the fiber of a bidirectional fiber link during each of the aforementioned three modes of an optical transmitter.

The power launched, in accordance with the teachings of the invention, into the fiber during the three modes in which the laser operates (the inactive, active and connect sequence modes referred to hereinbefore), is displayed in FIG. 3.

The two stage handshake for the connect sequence is used in order to prevent the optical connection of some other piece of hardware which does not have the open fiber link control function on it.

According to an illustrative embodiment of the invention, four time periods are defined and referred to in FIG. 3. Two 3 ms windows during which a light pulse is transmitted; a 7 ms window during which the safety system determines if indeed another card having a safety system is attached to the link; and a 48.8 second windows after which an attempt to power on an inactive laser takes place.

The 3 ms, 7 ms and 48.8 second windows were chosen only to illustrate the principles of the invention. The specific values chosen were for an optical fiber link up to 2 km in length, where the safety system is included in a card such as the one described in the incorporated application, and further wherein the electronics for realizing the safety system are similar to those components to be described hereinafter.

Those skilled in the art will recognize that the length of the "on" pulse (the 3 ms pulse in the illustrative embodiment of the invention) is a function of the optical power required by the overall system, the response time of the laser drive circuitry, and the laser safety standards which are to be met. Factors such as classification level (class 1, class 2, class 3B, etc.); wavelength of laser light; number of pulses during the applicable time base (where time base depends on the standard and class); accessible emission level (AEL) for a single pulse (which depends on the class, wavelength, pulse time "on", and the safety standard); and worst case environmental and life time effects on the laser's power, all would be considered in determining the length of the "on" pulse for a particular system application.

The 48.8 sec "repetition" time window is determined by the same items as the "on" time. (There is a give and take between the two times because the maximum power is related to duty cycle, i.e., "on" time divided by "repetition" time). Another factor in determining the "repetition" window is how long the external system is willing to wait for a reconnect signal to be sent out.

The 7 ms window is a function of control circuit response time and the time it takes for light to travel to the other end of the link and back (the longest path).

Portion A of FIG. 3 depicts the power launched into the fiber during the inactive mode of the laser, i.e., when the system is being initialized, or when the laser has previously been powered down. Here the 3 ms "on"

pulse is depicted occurring once every 48.8 seconds. "SP" in each of portions A, B and C of FIG. 3 is defined as the set point for the power launched into the fiber.

Portion B of FIG. 3 depicts the active mode of the laser, i.e., where continuous power is output by the laser.

Portion C of FIG. 3 depicts the laser's connect sequence mode, which is designed to assure that another card having an appropriate safety system is connected to the far end of the optical fiber link. This sequence prevents the safety interlock from being defeated by a modulated light source.

Portion C of FIG. 3 illustrates that sometime after the fiber is connected (at the end of one of the 48.8 second windows shown in portion A of FIG. 3), the 3 ms "on" pulse is caused to be sent by the safety system on one of the cards. The safety system on this card, as will be demonstrated hereinafter, is designed to check for return light during the 3 ms window.

At the end of the first 3 ms window depicted in portion C of FIG. 3, the laser is turned off. If return light was detected during the first 3 ms window, then the 7 ms window begins during which the safety system checks for a loss of return light. This occurrence would indicate that a card having an appropriate safety system is indeed coupled to the other end of the link.

If this event occurs during the 7 ms window, the laser is turned back on for 3 ms at the end of the 7 ms window. If return light is detected at the end of the second 3 ms window depicted in portion C of FIG. 3, the laser, under the control of the safety system on the card, is returned to continuous power.

Should a device not containing the safety system be attached to the far end of the link, the check for return light off during the 7 ms window will fail, and the laser will either return to the inactive mode (portion A of FIG. 3) or remain off indefinitely.

Figure 4:
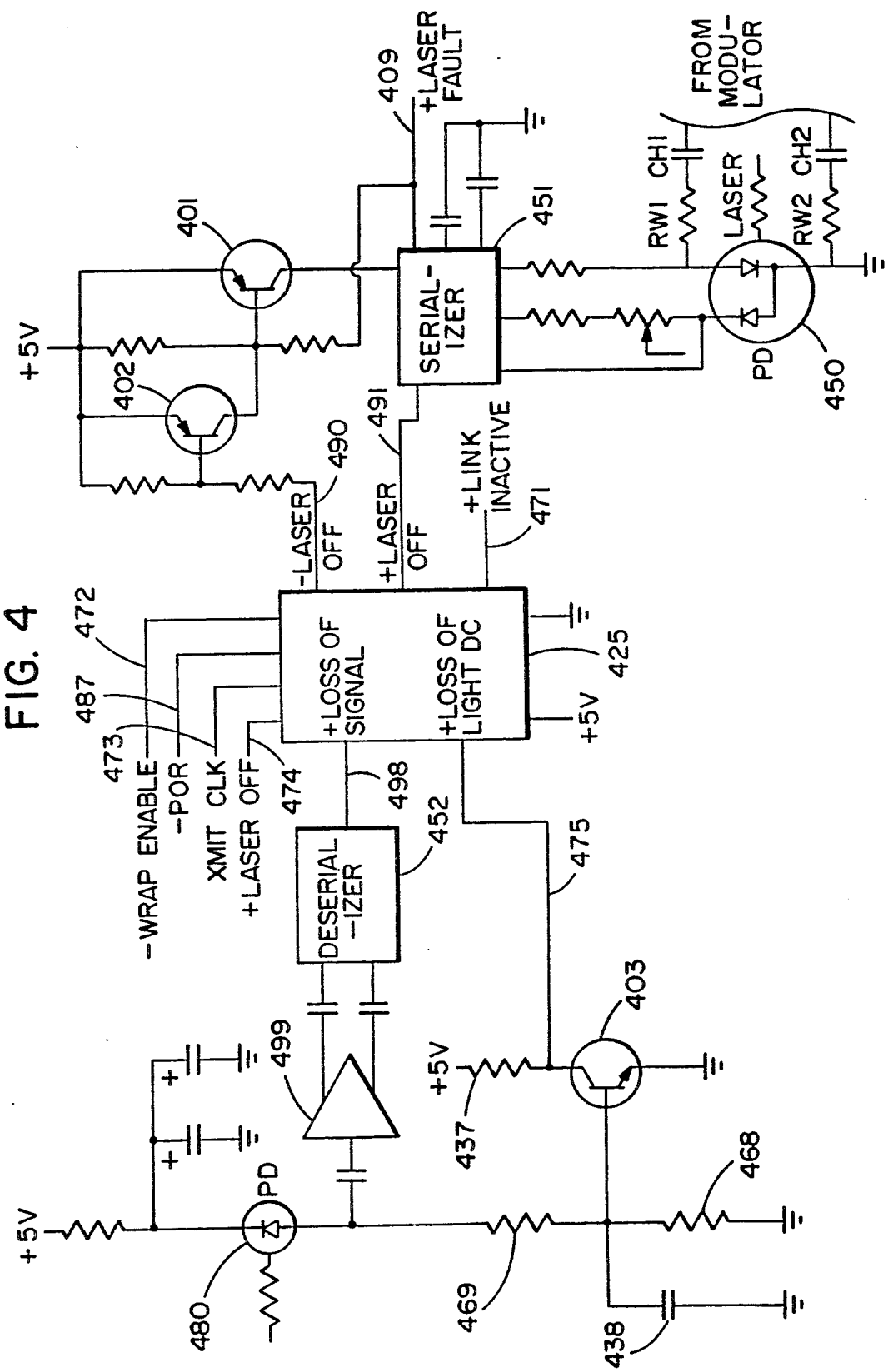
FIG. 4 illustrates schematically how the novel optical link safety system can be inserted onto an optical link card to provide a safety path between the optical transmitter and optical receiver located on each such card.

Reference is now made to FIG. 4 which illustrates schematically how to integrate the novel safety system, depicted as open fiber link controller 425 in FIG. 4, with laser control electronics, such as those described in the referenced copending patent application.

Controller 425 is shown inserted in a path between the combination of photodiode 480 and amplifier 499 (corresponding to, for example, unit 106 of FIG. 1), and the combination of serializer 451 (which according to the referenced application includes laser drive circuitry) and laser 450 (corresponding to, for example, unit 105 in FIG. 1).

A redundant laser off switch, transistor 401, is shown gated by an additional pnp transistor, transistor 402. A low level at the input of transistor 402 (carried via −off control link 490) forces laser 450 off. The normal "laser on" line of serializer 451 (with the serializer described in the referenced application being suitable for use in conjunction with the instant invention), is controlled by off control link 491.

When link 491 is high, laser 450 is forced off. Since a simultaneous high level and low level pair of logic lines is required to activate laser, 450, power supply voltage problems cannot force an accidental laser on command.

FIG. 4 also depicts, two light sensors which are used to provide the aforementioned receiver redundancy. Deserializer 452, coupled to controller 425 via link 498, contains one of the sensors, an envelope detector which, according to the illustrative embodiment of the invention, requires a minimum peak to peak AC voltage frequency above 1 MHz to be activated. Since photodiode 480 is AC coupled to this AC receiver, no DC leakages can activate it.

A second detector has been constructed by adding resistors 437, 468 and 469, capacitor 438, and a transistor, (transistor 403), to the photodiode circuit to sense its average DC current. According to the illustrative embodiment of the invention, at least 10 uamps of photodiode current is required to activate transistor 403.

When no light is present, photodiode 480 conducts less than 1 uamp, thus forcing transistor 403 off and +loss-of-light DC line 475 high.

Photodiode 480 is common to both sensors. However, a failure of the photodiode caused by an increase in its dark current (the only industry reported failure mode) can only activate the DC sensor, not the AC sensor.

According to the invention, both sensors must sense light from photodiode 480, followed by loss of light, before laser 450 is allowed to be activated (where loss of light indicates the existence of functional safety means at the other end of the fiber link).

The external (user) system to which the optical link card (as described in the incorporated patent application) is attached, is required to maintain the power supply within the voltage range 5.0 volts, plus or minus 20%. Within this range, the novel safety system is functional and capable of making the proper decisions concerning the link status.

FIG. 4 also depicts POR (power on reset) link 487. A signal on this link may be used by the safety system, but the safety conditions are not dependent on this signal's presence. Loss of the POR will either prevent any turn on attempts or will result in the two redundant circuits never synchronizing. If they do not synchronize, then the two redundant "laser on" signals will be at different times and the laser can never be activated.

The safety system depicted in FIG. 4 is also shown to include; (1) link 471, which facilitates the output of a link inactive status signal (when appropriate) from controller 425; (2) link 409, which facilitates the output of a laser fault signal; (3) and links 472–474 which facilitates the input of a wrap enable signal, a transmit clock signal, and a forced laser off signal (from a user), respectively.

According to a preferred embodiment of the invention, controller 425 can be implemented in a CMOS gate array packaged in a 28 pin plastic leadless chip carrier (PLCC) module. This module can be contained on the optical link cards described in the incorporated patent application, and can continuously monitor the status of the optical data link to which it is attached. No single fault in the safety system activates a laser such as laser 450.

Figure 5:
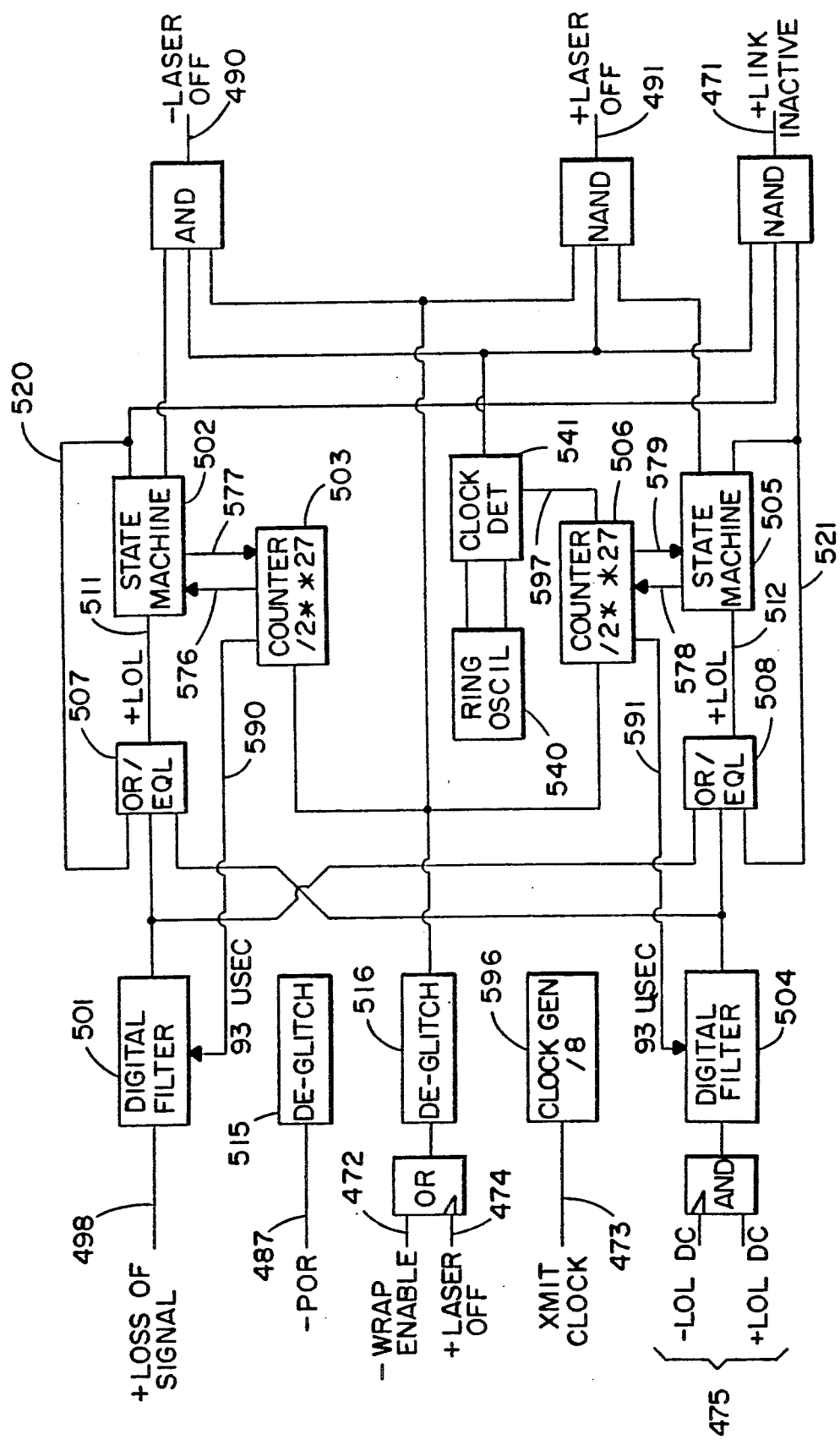
FIG. 5 is a block diagram of the open fiber link controller depicted in FIG. 4.

FIG. 5 depicts a block diagram of controller 425, with only the functional inputs and outputs necessary to describe the invention being shown. Other inputs and outputs (used for test purposes) are not depicted; however, those skilled in the art will readily appreciate that such inputs and outputs are desirable.

To aid in matching the functional inputs and outputs depicted in FIG. 5 with the schematic shown in FIG. 4, certain input and output link reference numerals from FIG. 4 are included in FIG. 5.

The block diagram for controller 425, as depicted in FIG. 5, shows that the controller provides two control paths that must be satisfied before the laser will be activated. This provides the desired redundancy required for optical safety.

Each path is shown to include a digital filter, state machine and a counter. In particular, a first path, between input link 498 and −laser off link 490, is shown to include digital filter 501, state machine 502 and counter 503. The second path, between input link 475 and output laser off link 491, is shown to include digital filter 504, state machine 505 and counter 506.

Counter 503 is shown coupled to state machine 502 (via links 576 and 577); while counter 506 is shown coupled to state machine 505 (via links 578 and 579), and to clock detector 541 (to be described hereinafter) via link 597.

The internal redundancy (within controller 425) is complimented externally, by the two aforementioned light detectors, and the two "laser off" circuits controlled via links 490 and 491 of FIG. 4.

The two loss of light detectors each feed a digital filter. The output of each filter and active state signal outputs from the respective state machines (fedback via links 520 and 521 in FIG. 5), are used by the "OR/EQL" function blocks (507 and 508 in FIG. 5) to form independent Loss of Light (LOL) signals (on links 511 and 512 in FIG. 5) internal to controller 425.

The "OR/EQL" function block is designed so that whenever the active state line is low (i.e., the state machine is in the check, stop or connect states), then both digital filter signals must agree in order for the LOL output signal to change logic levels. Hence, in the check or connect states, the LOL line will initially be high (LOL=1) and both digital filter signals must simultaneously indicate light present (logical 0) in order for LOL to switch low (LOL=0). Similarly, in the stop state, LOL is initially low (LOL=0) and both filter signals must simultaneously indicate loss of light (logical 1) in order for LOL to switch high (LOL=1). However, if the state machine is in the active state, a simple "OR" of the outputs of the digital filters is used to form the LOL signal. This allows either light detector, upon detecting a loss of light, to cause the state machine to exit the active state and turn off the laser.

Figure 6:
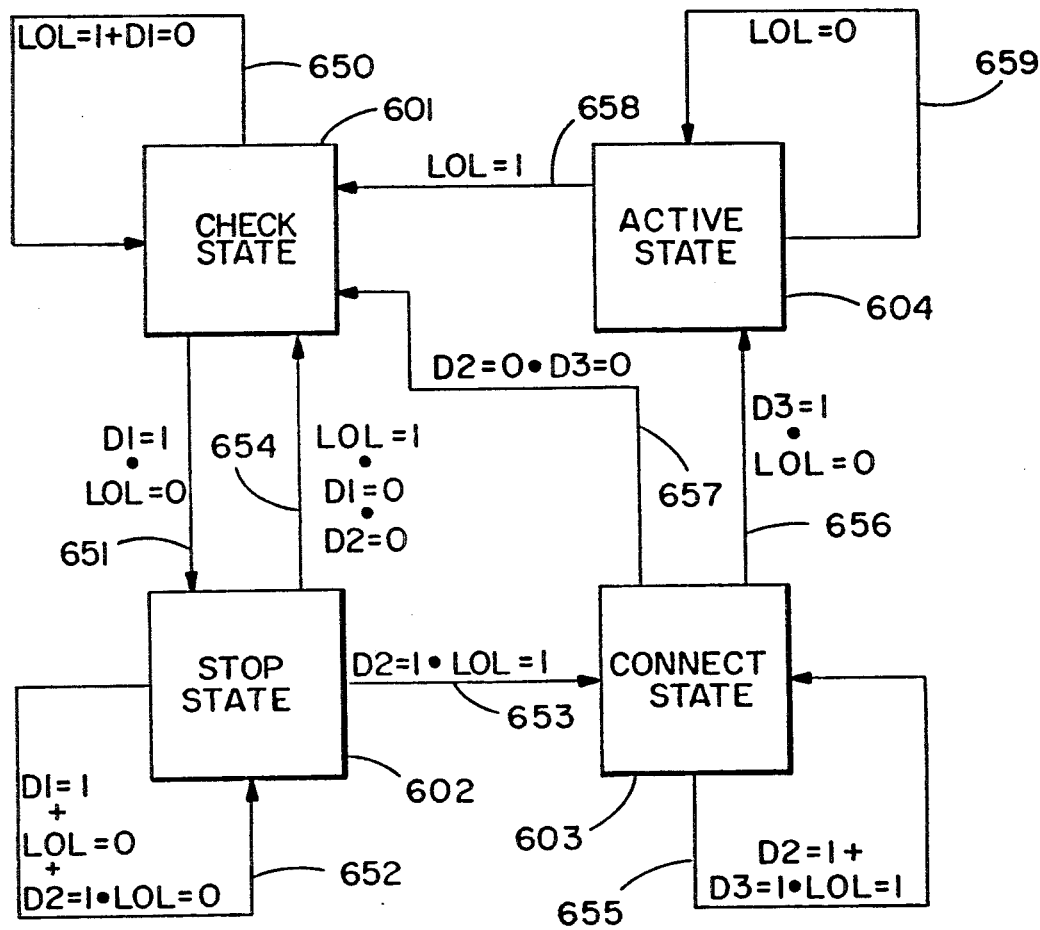
FIG. 6 is a block diagram that depicts all states and transitions of each of the state machines that, according to a preferred embodiment of the invention, is incorporated into the open fiber link controller depicted in FIGS. 4 and 5.

The LOL signals are used to synchronize the counters and state machines. The state machines control the connect sequence implemented on controller 425. A state diagram for these machines is shown in FIG. 6 and will be described in detail hereinafter.

Each state machine (502 and 505) controls a "laser off" output line (490 and 49 respectively) that connect to separate "laser off" circuits. The counters (503 and 506) control the duty cycle of laser pulsing when controller 425 senses an open link. The counters also provide the low frequency sampling clock to the digital filters (via links 590 and 591).

Digital filters 501 and 504 integrate the incoming signals to improve their reliability. The filters sample every 93 usec with a 22 MHz system clock. The filters used in the illustrative embodiment of the invention need a running total of eight counts in order to switch their outputs. Therefore, the minimum acquisition time is 8×93 usec or 744 usec, for these filters.

Controller 425 also contains ring oscillator 540 which drives clock detector 541, which monitors the "Xmit Clock" signal input via link 473. If the "Xmit Clock" signal gets stuck high or low, clock detector 541 will turn the laser off. This arrangement provides a back up safety feature to the single clock coming onto the chip. Changes in the clock frequency will cause the pulse duration and pulse repetition time to scale proportionally such that the duty cycle for the laser pulsing is not affected by the change in clock frequency. The illustrative embodiment of the invention is designed so that when and if the input clock speeds up by more than a factor of three, then the pulses will be too short for the laser to come on; if the clock slows down to 3 MHz, then the clock detector will turn off the laser.

The clock generator, 596 in FIG. 5, generates two nonoverlapping signals from "Xmit clock" signal 473. These two signals are used to clock all memory elements in controller 425.

The laser off and an electronic wrap input (inputs 474 and 472 respectively) are provided for, and can be controlled externally by, a user. Although a user can turn the laser off immediately by command, it cannot turn the laser on. Only controller 425 can activate the laser. If the link was active prior to executing laser off or wrap, then when either laser off or wrap return to their original state, the illustrative embodiment of the invention will immediately send out a 3 ms laser pulse to check the current link status. If the link was inactive prior to executing laser off or wrap, then the 48.8 sec wait period must elapse before the 3 ms laser pulse is sent.

During power-on-reset (POR) situations, controller 425 prevents any exposure to unsafe levels of laser radiation. An attempt to power on the laser is not made until 48.8 seconds after a valid POR is received. Therefore even during the initial power up period, the safety control circuitry is functional.

Finally, FIG. 5 depicts de-glitch circuits 515 and 516 which ensure the stability of the −POR, −wrap enable and +laser off inputs; and other standard logic as specifically indicated in FIG. 5, to gate the various inputs and outputs to/from controller 425.

Reference is now made to FIG. 6 which is a block diagram that depicts all states and transitions of each of the state machines that, according to a preferred embodiment of the invention, is incorporated into the open fiber link controller (controller 425) depicted in FIGS. 4 and 5. Each machine verifies that the card on the other end of the fiber also has open fiber sense circuitry. A description of all the states and transitions follows immediately hereinafter.

Each state machine has four variables that control the transitions from state to state. The Loss of Light (LOL) signal is formed by the aforementioned "OR/EQL" function such that both sensors must agree to pass through check, stop and connect states to activate the link, but once activated either light sensor detecting no light will stop the link.

The three decodes (shown in the key on FIG. 6 as D1, D2 and D3) are generated by each counter in controller 425. The decodes are used to ensure that no ON-OFF-ON sequence generated by the physical insertion of a fiber into the connector can accidentally indicate a safe link. The timing of each decode is based on the illustrative embodiment's 22 MHz clock input. All the timing would change proportionally if the clock frequency is changed.

What follows is a functional description of each of the four states of operation of controller 425. Those skilled in the art can readily implement the desired state machines on controller 425, using off-the-shelf electronic components, once the desired function of each state machine The state machine is assumed to start in the "check" state, indicated by block 601 in FIG. 6. While in the check state, controller 425 is checking for a closed optical link by transmitting a 3 ms light pulse every 48.8 seconds. As long as LOL remains high, controller 425 stays in this state. To exit from check state, light must be sent and received by the optical link card. This is satisfied if controller 425 is responding to an incoming pulse or receiving an answer to an outgoing pulse.

If during a 3 ms D1 light pulse transmission (i.e., D1=1), LOL goes low (i.e., an answer is received), then controller 425 exits (as indicated by link 651) to the stop state, shown as block 602 in FIG. 6.

The second way to exit from the check state occurs if LOL goes low (LOL=0) sometime during the 48.8 second wait period. The counters controlling the timing are reset, D1 is set high (D1=1) and a 3 ms light pulse is sent out in response to the received light pulse. This also causes controller 425 to exit (via link 651) to the stop state.

While in the stop state, the 7 ms D2 timer period (D2=1) begins, and controller 425 turns off the laser to see if the card at the opposite end of the fiber link responds accordingly. This verifies that the other card has the appropriate open fiber safety circuitry. The laser is not turned off (i.e., the D2=1 period does not begin) until after the 3 ms D1 pulse has completed. This ensures that the pulse was long enough for the other card to receive the D1 pulse and send an answer to it. Controller 425 stays in the stop state (as indicated by link 652) for as long as LOL is low (i.e., light is being received). This could be for an indefinite period of time.

One possible exit from the stop state (via link 653) is when LOL=1 and D2=1. This occurs when light is no longer being received (LOL=1) within 7 msec of controller 425 turning off the laser. This is the proper response from the card at the other end of the fiber, and controller 425 then proceeds to the connect state, shown as block 603 in FIG. 6.

The other possible exit from the stop state (via link 654) is when LOL=1, D1=0 and D2=0. This results when light is no longer being received after the 7 msec D2 period of controller 425 has elapsed (D2=0). Controller 425 then goes back to the check state and waits for the 48.8 second timing period to elapse before sending out another 3 ms D1 light pulse.

While in the connect state, controller 425 sends out a second 3 ms light pulse (D3) to establish a verified safe link with the card at the opposite end of the fiber link. The pulse does not get sent out until after the 7 msec D2 period has ended.

Controller 425 will remain in the connect state (as indicated by link 655) during the 3 ms pulse period waiting for an answer to its D3 pulse, D3=1 and LOL=1.

One possible exit (via link 656) from the connect state is when D3=1 and LOL=0. This means the other card answered the D3 pulse. Controller 425 then proceeds to the active state, shown as block 604 in FIG. 6. This is the "proper" response.

The other possible exit (via link 657) from the connect state is when D2=0 and D3=0. This means the card at the opposite end of the fiber link did not answer within the required 3 ms period. Controller 425 then causes the laser to be turned off, proceeds to the check state, and waits 48.8 seconds before sending out a D1 pulse in another attempt to link up.

Finally, FIG. 6 depicts the active state (block 604). During the active state controller 425 latches the laser on. Controller 425 stays in the active state as long as light is being received, i.e., LOL=0 as indicated by link 659.

The only exit from the active state (via link 658) is when LOL=1 (i.e., light is no longer being received). This could be from an open fiber or the other card turning its laser off for any reason. Controller 425 would then proceed to the check state.

Controller 425 is meant to have (and does have) absolute control over the operation of the laser in the event of a break anywhere in the round trip link between itself and another optical link card. Controller 425 makes use of pulsing during the time that a link is open in order not to exceed the class 1 limits for laser radiation exposure while still allowing the link to resume normal operation should the connection once again become closed. In addition, controller 425 makes use of the previously described reconnection handshake to ensure that the card at the other end of the link contains a properly functioning safety system. Thus, controller 425 provides an electronic safety interlock for the optical link card.

What has been described is a safety system meeting all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A fully redundant safety interlock for a fiber optic link, comprising:
    (a) means for detecting loss of light on said link, including means for separately outputting at least two independent loss of light signals; and
    (b) controller means, coupled to said means for separately outputting, for controlling the radiant energy output by an optical transmitter, based at least in part on the values of said independent loss of light signals as separately outputted by said means for detecting.

2. Apparatus as set forth in claim 1 wherein said controller means is operative to cause the radiant energy output by said optical transmitter to be limited or shut off whenever said transmitter is continuously outputting radiant energy and nay of said loss of light signals indicate loss of light on the link.

3. Apparatus as set forth in claim 1 wherein said controller means further comprises:
    (a) means for determining the safety condition of said link, in terms of whether or not the link is closed and contains functioning safety apparatus at the opposite end of the link, including means for outputting at least two separate signals indicative of said safety condition; and
    (b) output means, coupled to said means for determining, for outputting redundant signals in response to said separate signals, wherein said redundant signals are be used to control the radiant energy output by said transmitter.

4. Apparatus as set forth in claim 3 wherein said means for determining further comprises a plurality of state machines, the states of which are used, together with said independent loss of light signals, to determine the safety condition of said link.

5. Apparatus as set forth in claim 4 wherein said means for detecting further comprises a plurality of timers, each associated with one of said plurality of state machines.

6. Apparatus as set forth in claim 4 wherein said state machines each include at least a check state, corresponding to an inactive mode of said transmitter; an active state, corresponding to an active mode of said transmitter; and both a stop state and a connect state, which exist when said transmitter is in a connect mode.

7. Apparatus as set forth in claim 6 wherein the redundant signals outputted by said controller means are operative to cause said transmitter to be pulsed at a predetermined frequency during said inactive mode.

8. Apparatus as set forth in claim 6 wherein the redundant signals outputted by said controller means are operative to cause reconnection handshake signals to be outputted by said transmitter during said connect mode, to enable said controller means to determine if said link is closed and that functioning safety apparatus exists at the opposite end of the link.

9. Apparatus as set forth in claim 8 wherein said redundant signals outputted by said controller means are operative to inhibit continuous power from being provided to said transmitter unless said controller means determines during said connect mode that said link is closed and contains functioning safety apparatus at the opposite end of the link.

10. Apparatus as set forth in claim 6 wherein the redundant signals outputted by said controller means are operative to provide continuous power to said transmitter during said active mode.

11. Apparatus as set forth in claim 3 further comprising interconnect means, coupled to said output means, for interconnecting said redundant signals to transmitter drive circuitry.

12. Apparatus as set forth in claim 11 wherein said interconnect means comprises a redundant laser switch that requires redundant signal inputs of opposite polarity to continuously activate said transmitter.

13. Apparatus as set forth in claim 3 wherein said controller means is responsive to user generated power on reset signals and, in response thereto, first determines the safety condition of said link before permitting the transmitter to be continuously activated.

14. Apparatus as set forth in claim 1 wherien said means for detecting further comprises at least two independent light sensors.

15. Apparatus as set forth in claim 14 wherein at least one of said light sensors is an envelope detector requiring a threshold peak to peak AC voltage frequency to be activated.

16. Apparatus as set forth in claim 14 wherein at least one of said light sensors is utilized to sense the average DC current resulting from detected light.

17. Apparatus as set forth in claim 1 wherein said controller means further comprises means for powering down said transmitter in response to user input control signals.

18. Apparatus as set forth in claim 1 wherein said controller means further comprises means for signalling inactive link status to a user.

19. A fully redundant safety interlock for a fiber optic link, comprising:
(a) means for sensing a fiber disconnect as a function of at least two independent signals which separately indicate the presence or absence of light on said link, wherein each of said signals is developed utilizing differing sensing criteria and further wherein each of said signals is separately outputted from said means for sensing; and
(b) controller means, coupled to the output of said means for sensing, operative to cause the radiant energy outputted by an optical transmitter to be limited or shut off whenever a fiber disconnect is sensed.

20. Apparatus as set forth in claim 19 wherein said controller means further comprises means for periodically causing said transmitter to emit pulses used to determine if said fiber has been reconnected.

21. Apparatus as set forth in claim 20 wherein said controller means further comprises means for causing reconnect handshake signals to be outputted by said transmitter, to enable said controller means to determine if said link is closed and that functioning safety apparatus exists at the opposite end of the link.

22. Apparatus as set forth in claim 21 wherein said controller means further comprises means for causing the restoration of continuous radiant energy outputted by said transmitter whenever said fiber has been reconnected, so long as said reconnect handshake signals indicate that functioning safety apparatus exists at the opposite end of the link.

23. An open fiber link safety system for providing a fully redundant safety interlock for a fiber optic link wherein said link includes first and second optical link cards, each of which is capable of transmitting and receiving data over said link, and further wherein said first card includes a first optical transmitter, drive means for said first transmitter, and first receiver/amplifier means; and further wherein said second card includes a second optical transmitter, driver means for said second transmitter, and second receiver/amplifier means, comprising:
(a) first safety means, coupled between said driver means for said first optical transmitter and said first receiver/amplifier means; and
(b) second safety means, coupled between said driver means for said second optical transmitter and said second receiver/amplifier means, wherein said first and second safety means each comprise means for detecting loss f light on said link, including means for separately outputting at least two independent loss of light signals wherein each of said signals is developed utilizing differing criteria for detecting loss of light, and further wherein said first and second safety means are each operative to power down the respective transmitters to which they are coupled upon detecting a break in said link.

24. Apparatus as set forth in claim 23 wherein each of said safety means further comprises
controller means, coupled to said means for detecting, for controlling the radiant energy outputted by an optical transmitter, based at least in part on the values of said independent loss of light signals.

25. Apparatus as set forth in claim 24 wherein each of said safety means is further operative to cause continuous radiant energy to be generated by said first and second optical transmitters, when a link is being initialized or reconnected, only if each safety means is able to verify the existence of the other safety means as part of the link.

26. Apparatus as set forth in claim 24 wherein each of said controller means further comprises:
    (a) means for determining the safety condition of said link, in terms of whether or not the link is closed and contains functioning safety apparatus at the opposite end of the link, including means for outputting at least two separate signals indicative of said safety condition; and
    (b) output means, coupled to said means for determining, for outputting redundant signals in response to said separate signals, wherein said redundant signals may be used to control the radiant energy output by said transmitter.

27. Apparatus as set forth in claim 26 wherein said means for determining further comprises a plurality of state machines, the states of which are used, together with said independent loss of light signals, to determine the safety condition of said link.

28. Apparatus as set forth in claim 27 wherein said means for detecting further comprises a plurality of timers, each associated with one of said plurality of state machines.

29. A method for providing a fully redundant safety interlock for a fiber optic link, wherein said link includes a first optical fiber, a second optical fiber, first and second optical link cards, each of which is capable of transmitting and receiving data over said link, and further wherein said first card includes a first optical transmitter for transmitting optical signals between said first card and said second card via said first fiber, first receiver/amplifier means, first safety control means and first timer means; and further wherein said second card includes a second optical transmitter for transmitting optical signals between said second card and said first card via said second fiber, second receiver/amplifier means, second safety control means and second timer means, comprising the steps of:
    (a) disabling said first and second optical transmitters whenever said first optical fiber is disconnected by:
        (a1) generating a first loss of light signal via said second receiver/amplifier means, for use by said second safety control means whenever said first fiber is disconnected from the link;
        (a2) powering down said second optical transmitter, via said second safety control means, in response to said first loss of light signal;
        (a3) generating a second loss of light signal, via said first receiver/amplifier means, as a result of said second optical transmitter being powered down; and
        (a4) powering down said first optical transmitter, via said first safety control means, in response to said second loss of light signal, to thereby create a safe condition with respect to the open link created by the disconnection of said first optical fiber;
    (b) starting a timer maintained by said second timer means when said second optical transmitter is powered down according to step (a2);
    (c) starting a timer maintained by said first timer means, wherein the timers maintained by said first and second timer means are distinct, when said first optical transmitter is powered down according to step (a4); and
    (d) powering up each of said first and second optical transmitters after a time period T, for a smaller time period t, in a synchronous fashion, in order to check link status.

30. A method as set forth in claim 29 further comprising the step of generating reconnect handshake signals via said first and second safety control means to verify closed link status and verify that a functioning safety device exists at both ends of the link.

31. A method as set forth in claim 30 further comprising the step of permitting continuous radiant energy to be outputted by both said first and second optical transmitters in the event both closed link status and the existence of a functioning safety device at both ends of the link are verified via said handshake signals.

32. A method as set forth in claim 31 further comprising the step of powering down said first and second optical transmitters for time period T and repeating step (d) if said handshake signal fails to verify both closed link status and the existence of a functioning safety device at both ends of the link.

33. A method for providing a fully redundant safety interlock for a fiber optic link, wherein said link includes a first optical fiber, a second optical fiber, first and second optical link cards, each of which is capable of transmitting and receiving data over said link and further wherein said first card includes a first optical transmitter for transmitting optical signals between said first card and said second card via said first fiber, first receiver/amplifier means, first safety control means and first timer means; and further wherein said second card includes a second optical transmitter for transmitting optical signals between said second card and said first card via said second fiber, second receiver/amplifier means, second safety control means and second timer means, comprising the steps of:
    (a) disabling said first and second optical transmitters whenever said second optical fiber si disconnected by:
        (a1) generating a first loss of light signal via said first receiver/amplifier means, for use by said first safety control means whenever said second fiber is disconnected from the link;
        (a2) powering down said first optical transmitter, via said first safety control means, in response to said first loss of light signal;
        (a3) generating a second loss of light signal, via said second receiver/amplifier means, as a result of said first optical transmitter being powered down; and
        (a4) powering down said second optical transmitter, via said second safety control means, in response to said second loss of light signal, to thereby create a safe condition with respect to the open link created by the disconnection of said second optical fiber;
    (b) starting a timer maintained by said fist timer means when said first optical transmitter is powered down according to step (a2);
    (c) starting a timer maintained by said second timer means, wherein the timers maintained by said first and second timer means are distinct, when said second timer means are distinct, when said second optical transmitter is powered down according to step (a4); and
    (d) powering up each of said first and second optical transmitters after a time period T, for a smaller time period t, in a synchronous fashion, in order to check link status.

34. A safety interlock for a fiber optic link, comprising:

(a) means for sensing a fiber disconnect as a function of a signal which indicates the presence or absence of light on said link;

(b) controller means, coupled to said means for sensing, operative to cause the radiant energy output by an optical transmitter to be limited or shut of whenever a fiber disconnect is sensed, wherein said controller means further comprises:

(b1) means for periodically causing said transmitter to emit pulses used to determine if said fiber has been reconnected;

(b2) means for causing reconnect handshake signals to be output by said transmitter, to enable said controller means to determine if said link is closed; and (b3) means for causing the restoration of continuous radiant energy to be output by said transmitter whenever said fiber has been reconnected.

35. A safety interlock for a fiber optical link having an optical transmitter and detector of radiant energy for communicating data to and from a remote unit as radiant energy over optical fibers, comprising:

(a) a receiver coupled to said detector means for sensing loss of said radiant energy from one of said fibers carrying said data;

(b) a driver coupled to said transmitter for limiting the optical output of said transmitter;

(c) a controller coupled to said receiver and driver, and including first means for limiting said optical output in response to said loss of radiant energy, second means responsive to said first means to pulse said driver in a predetermined handshake sequence, and third means responsive to said second means and to a predetermined handshake response from said remote unit on one of said optical fibers to inhibit said driver from limiting said output.

36. A method for providing safety in a link having a plurality of optical fibers for transmitting data as a first level of radiant energy over a first of said optical fibers from a local data system to a remote data system and for receiving data from a remote system over a second of said optical fibers, said method comprising;

(a) detecting a loss of radiant energy in said first optical fiber;

(b) after step (a), limiting the radiant energy transmitted on said first optical fiber to a second level which is lower than said first level;

(c) after step (b), receiving at said local data system a predetermined handshake response in said first optical fiber indicating that said one optical fiber has been reconnected; and (d) after step (c), resuming said first level of radiant energy in said first optical fiber.

37. A method as set forth in claim 36 wherein said step of limiting radiant energy transmitted on said first optical fiber further comprises the step of transmitting a sequence of pulses in a predetermined handshake sequence on said first optical fiber.

* * * * *